United States Patent
Ono et al.

(10) Patent No.: US 10,082,183 B2
(45) Date of Patent: Sep. 25, 2018

(54) CLUTCH CONTROL HYDRAULIC CIRCUIT FOR VEHICLE AND VEHICLE INCLUDING SAME

(71) Applicant: HONDA MOTOR CO., LTD., Minato-ku, Tokyo (JP)

(72) Inventors: Junya Ono, Wako (JP); Yoshiaki Nedachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 15/182,045

(22) Filed: Jun. 14, 2016

(65) Prior Publication Data

US 2016/0369854 A1    Dec. 22, 2016

(30) Foreign Application Priority Data

Jun. 18, 2015    (JP) .................. 2015-123087

(51) Int. Cl.
*F16D 48/02* (2006.01)
*F16D 48/06* (2006.01)

(52) U.S. Cl.
CPC ......... *F16D 48/02* (2013.01); *F16D 48/0206* (2013.01); *F16D 48/06* (2013.01);
(Continued)

(58) Field of Classification Search
CPC ............. F16D 48/02; F16D 2048/0221; F16D 2048/0254; F16D 2048/0266; F16D 2048/0275; F16D 48/06; F16D 48/066; F16D 2500/10412; F16D 2500/3024; F16D 2500/50203; F16D 2500/5114
(Continued)

(56) References Cited

U.S. PATENT DOCUMENTS 5,135,091 A * 8/1992 Albers ............... F16D 48/04
192/83
5,217,097 A * 6/1993 Lasoen ............... F16D 48/066
192/103 F (Continued)

FOREIGN PATENT DOCUMENTS

| JP | H05-14664 U | 2/1993 |
| JP | H08-296670 A | 11/1996 |
| JP | 4815256 B2 | 11/2011 |

*Primary Examiner* — Richard M Lorence
(74) *Attorney, Agent, or Firm* — Carrier Blackman & Associates, P.C.; Joseph P. Carrier; William D. Blackman

(57) ABSTRACT

A clutch control hydraulic circuit includes first and second solenoid valves connected to a control unit, the first solenoid valve is provided between a first hydraulic pathway and a downstream junction hydraulic pathway normally switches to an open state when not energized, and switches to a closed state when energized; and the second solenoid valve is provided between a second hydraulic pathway and the junction hydraulic pathway, switches to a closed state when not energized, and switches to an open state when energized. The first solenoid valve maintains its closed state when switched to a non-energized state from an energized state while pressure of the junction hydraulic pathway is higher than that of the first hydraulic pathway, and when the first solenoid valve is thus closed in its non-energized state, pressurizing the upstream side hydraulic pathway by operation of a clutch lever opens the first solenoid valve.

18 Claims, 4 Drawing Sheets

(52) U.S. Cl.
CPC ............... *F16D 2048/0221* (2013.01); *F16D 2048/0236* (2013.01); *F16D 2048/0254* (2013.01); *F16D 2048/0266* (2013.01); *F16D 2500/50203* (2013.01)

(58) Field of Classification Search
USPC ................................................ 192/83, 85.63
See application file for complete search history.

(56) References Cited

U.S. PATENT DOCUMENTS

| | | | | |
|---|---|---|---|---|
| 5,273,143 A | * | 12/1993 | Voss ..................... | F16D 48/066 192/3.58 |
| 2006/0131123 A1 | * | 6/2006 | Grethel ................ | F15B 20/004 192/85.01 |

* cited by examiner

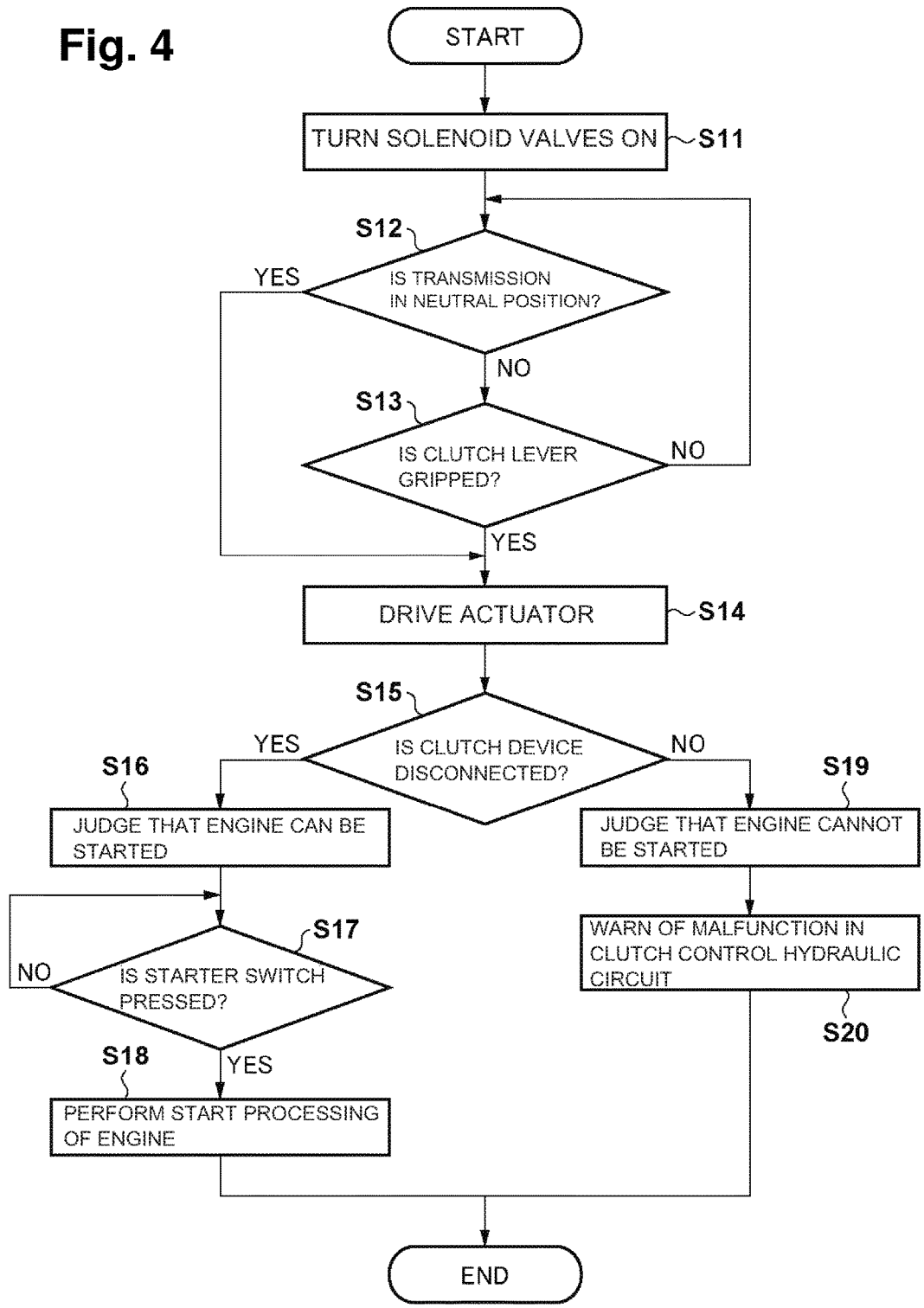

CLUTCH CONTROL HYDRAULIC CIRCUIT FOR VEHICLE AND VEHICLE INCLUDING SAME

CROSS-REFERENCE TO RELATED APPLICATIONS

The present invention claims priority under 35 USC 119 based on Japanese patent application No. 2015-123087, filed on Jun. 18, 2015. The entire subject matter of this priority document, including specification claims and drawings thereof, is incorporated by reference herein.

BACKGROUND OF THE INVENTION

1. Field of the Invention

The present invention relates to a clutch control hydraulic circuit for a vehicle or the like. More particularly, the present invention relates to such a clutch control hydraulic circuit which can be automatically and manually operated, and which reliably controls connection and disconnection of a clutch device under both normal operation and fail safe operation.

2. Background Art

As a conventional clutch control hydraulic circuit, and a method for assigning an electronically-controlled automatic connection and disconnection function, and a manually-controlled manual connection and disconnection function to a common clutch device, Japanese Patent Application Publication No. Hei 8-296670 discloses that hydraulic circuits associated with a clutch pedal and motor are unified by inserting a three port valve in between these components.

Japanese Utility Model Registration Application Publication No. Hei 5-014664 discloses another known clutch apparatus for a vehicle and, more particularly, such a clutch device which automatically performs the opening operation of the clutch independently of the clutch pedal.

Problem to be Solved by the Invention

While the known devices function appropriately for their intended uses, when a clutch device has an automatic connection and disconnection function and a manual connection and disconnection function, consideration must be given to situations of abnormal operation. For example, it is important that the clutch device be surely switchable to the manual connection and disconnection function when a vehicle is not energized or when electronic control fails, and to maintain normal travel before the switching.

SUMMARY OF THE INVENTION

The present invention aims to satisfy this concern, and to specifically provide a clutch control hydraulic circuit which is configured so that a clutch device having an automatic connection and disconnection function and a manual connection and disconnection function can surely switch to the manual connection and disconnection function when a vehicle on which the hydraulic circuit is provided is not energized or when electronic control fails, and can maintain normal travel before such switching.

In the discussion of aspects of the present invention below, reference numbers are included which correspond to components of exemplary embodiments set forth in this disclosure, and are intended to help the reader achieve a better understand the invention. However, inclusion of the reference numbers is not intended to restrict or limit the invention as defined in the claims appended hereto in any way.

According to a first aspect of the present invention there is provided a clutch control hydraulic circuit for use on a vehicle including: a manual controller (11) arbitrarily controllable by an operator; a control unit (12); an actuator (13) for increasing and decreasing hydraulic pressure based on a control signal from the control unit (12); a hydraulic circuit including a first hydraulic pathway (15) connected to the manual controller, a second hydraulic pathway (16) connected to the actuator, and a junction hydraulic pathway (17) which joins the first hydraulic pathway and the second hydraulic pathway; and a clutch device (18) connected to the hydraulic circuit so that connection and disconnection of the clutch device is controlled by receiving pressure of the hydraulic circuit wherein: the junction hydraulic pathway (17) is located downstream of the first and second hydraulic pathways, the hydraulic circuit includes first and second hydraulic circuit control valves (19, 20) connected to the control unit; the first hydraulic circuit control valve (19) is provided between the first hydraulic pathway and the junction hydraulic pathway, normally switches to an open state when not energized, and switches to a closed state when energized; the second hydraulic circuit control valve (20) is provided between the second hydraulic pathway and the junction hydraulic pathway, switches to a closed state when not energized, and switches to an open state when energized; the first hydraulic circuit control valve maintains its closed state, when switched to a non-energized state from an energized state while pressure of the junction hydraulic pathway (17) is higher than pressure of first hydraulic pathway (15); and when the first hydraulic circuit control valve is closed in the non-energized state, pressurizing the first hydraulic pathway upstream of the first hydraulic circuit control valve by operation of the manual controller opens the first hydraulic circuit control valve.

According to a second aspect of the present invention, the clutch control hydraulic circuit further includes an oil reserve tank (25); and the oil reserve tank is connected to the first hydraulic pathway and the second hydraulic pathway.

According to a third aspect of the present invention, the control unit is switchable between a first mode, in which the clutch device is connected to the manual controller, and a second mode, in which the clutch device is connected to the actuator; in the first mode the control unit controls the actuator to open the first hydraulic circuit control valve and close the second hydraulic circuit control valve; and in the second mode the control unit controls the actuator to close the first hydraulic circuit control valve and open the second hydraulic circuit control valve.

According to a fourth aspect of the present invention, the clutch control hydraulic circuit further includes: a dummy load (26) which applies an operation load on operation of the manual controller; and a third hydraulic circuit control valve (21) which is provided between the first hydraulic pathway and the dummy load, switches to a closed state when not energized, and switches to an open state when energized, wherein the third hydraulic circuit control valve is closed in the first mode; and the third hydraulic circuit control valve is opened in the second mode.

According to a fifth aspect of the present invention, the first hydraulic circuit control valve is a poppet valve having a valve element movable in an axial direction in a flow path inside the poppet valve such that an end part of the valve element closes the flow path.

Advantageous Effect of the Invention

According to the first aspect of invention, a clutch control hydraulic circuit having a junction hydraulic pathway and allowing manual intervention can be desirably configured with a small number of parts. Also, if the control unit fails while the clutch device is disconnected by controlling the actuator and generating hydraulic pressure, when the first and second hydraulic circuit control valves are energized, the first hydraulic circuit control valve maintains the closed state even when not energized, due to a hydraulic pressure lock phenomenon caused by difference in pressure between the upstream side and downstream side of the valve member. Hence, disconnection of the clutch device can be maintained until the manual intervention is performed.

According to the second aspect of the invention, since the oil reserve tank is common to the first and second hydraulic pathways, hydraulic pressure from the actuator can be released through the first hydraulic pathway when manual intervention is performed. Hence, a clutch control hydraulic circuit having a junction hydraulic pathway and allowing manual intervention can be configured with a small number of parts.

According to the third aspect of the invention, by switching states of each of the two hydraulic circuit control valves, connection and disconnection of the clutch can be simply switched between operation by the actuator and by manual operation.

According to the fourth aspect of the invention, a stroke simulation on operation of the manual controller is enabled in the second mode, and the stroke simulation is disabled in the first mode.

According to the fifth aspect of the invention, again, the first hydraulic circuit control valve maintains its closed state even when not energized, due to the hydraulic pressure lock phenomenon caused by difference in pressure between the upstream side and downstream side of the valve member. Hence, disconnection of the clutch device can be simply and surely maintained until manual intervention is performed.

For a more complete understanding of the present invention, the reader is referred to the following, non-limiting, detailed description section, which describes an exemplary embodiment of the present invention and should be read in conjunction with the accompanying drawings. Such exemplary embodiment is provided for illustration and better understanding of the present invention and is not intended to limit the invention. Throughout the following detailed description and in the drawings, like numbers refer to like parts.

BRIEF DESCRIPTION OF THE DRAWINGS

FIG. 4 is a flowchart describing exemplary controls of the clutch control hydraulic circuit effected by an ECU, at the time of starting of an engine of a vehicle on which the clutch control hydraulic circuit is provided, according to an exemplary embodiment of the present invention.

DETAILED DESCRIPTION INCLUDING BEST MODE FOR CARRYING OUT THE INVENTION

Hereinafter, a clutch control hydraulic circuit according to an exemplary embodiment of the present invention will be described in detail, with reference to the drawings. Note that the exemplary embodiment does not limit the invention according to the scope of claims, and not all of combinations of configurations described in the exemplary embodiment are necessarily essential to the advantageous solution provided by the invention.

Configuration of Hydraulic Circuit
When a Vehicle on which the Clutch Control Hydraulic Circuit is Provided is Not Energized.

Figure 1:
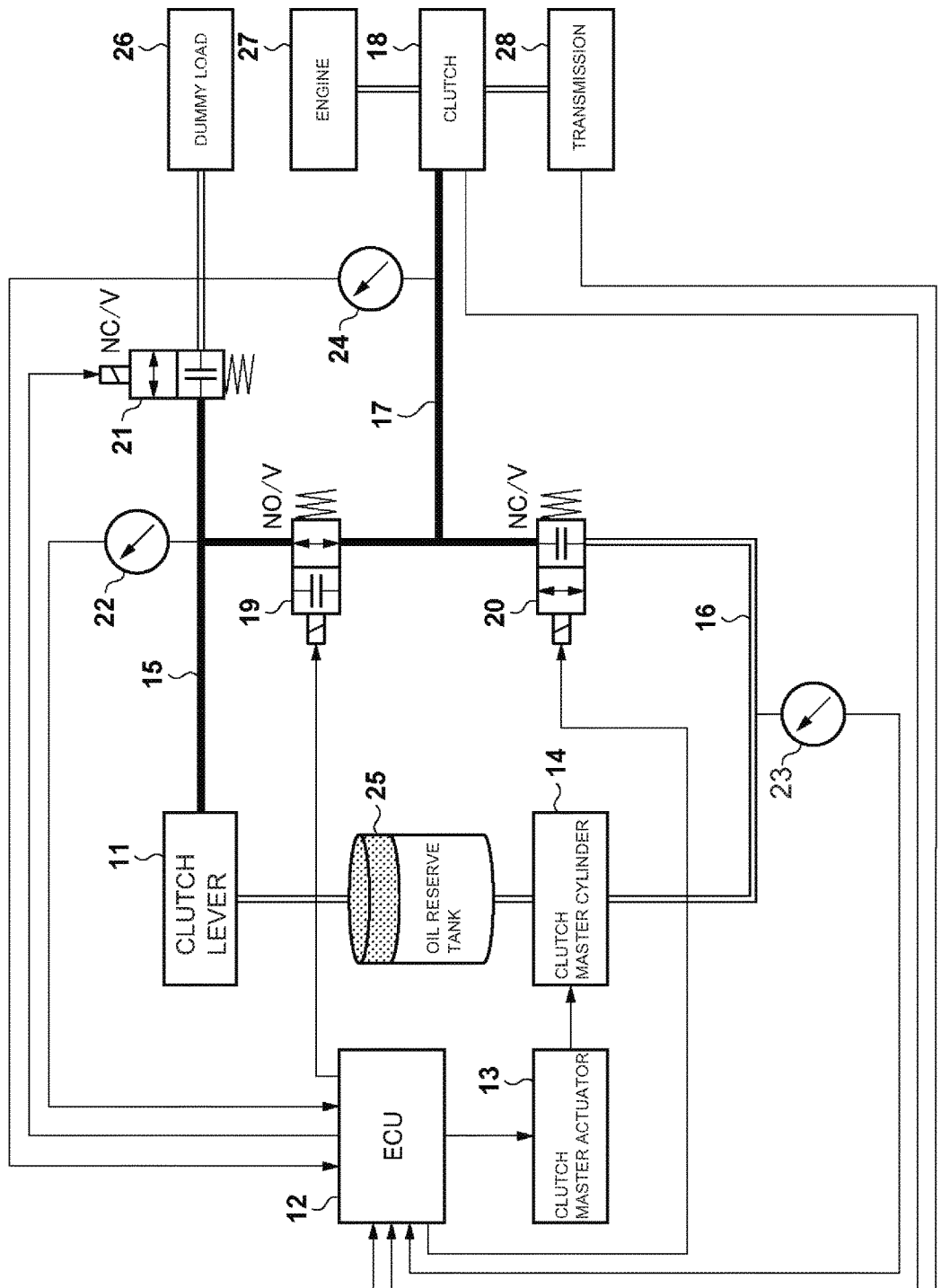
FIG. 1 is a block diagram showing a configuration example of a clutch control hydraulic circuit, as provided on a vehicle or the like, is in a non-energized state according to an exemplary embodiment of the present invention.

A block diagram of FIG. 1 shows a configuration example of the clutch control hydraulic circuit of the exemplary embodiment.

A clutch lever 11 is an example of a manual controller, which a rider of a vehicle such as a motorcycle can control arbitrarily. For example, the rider instructs disconnection (operation of shutting off transmission of drive power from an engine 27 to a transmission 28) of a clutch device 18, by gripping the clutch lever 11. Also, the rider instructs connection (operation of transmitting drive power from the engine 27 to the transmission 28) of the clutch device 18, by releasing the clutch lever 11. When the clutch lever 11 is gripped, hydraulic pressure depending on the amount of gripping of the clutch lever 11 is applied to a first hydraulic pathway 15, which is connected to an oil reserve tank 25.

An electronic control unit (ECU) 12, which executes programming stored on computer-readable media or includes appropriate electronic circuitry, controls operation of a clutch master actuator (hereinafter referred to as actuator) 13, based on hydraulic pressure (hereinafter referred to as first hydraulic pressure) detected by a hydraulic pressure sensor 22 arranged in the first hydraulic pathway 15. The actuator 13 drives a clutch master cylinder (hereinafter referred to as master cylinder) 14, based on a control signal from the ECU 12. Hydraulic pressure depending on the drive of the master cylinder 14 is applied to a second hydraulic pathway 16, which is connected to the oil reserve tank 25.

The ECU 12 controls operation of the actuator 13, to control, according to the first hydraulic pressure, hydraulic pressure (hereinafter referred to as second hydraulic pressure) detected by a hydraulic pressure sensor 23 arranged in the second hydraulic pathway 16, and hydraulic pressure (hereinafter referred to as third hydraulic pressure) detected by a hydraulic pressure sensor 24 arranged in a later mentioned junction hydraulic pathway 17. In other words, the ECU performs a stroke simulation, where it raises the second and third hydraulic pressures if the first hydraulic pressure rises, and lowers the second and third hydraulic pressures if the first hydraulic pressure lowers. Note that the second hydraulic pressure and the third hydraulic pressure are normally the same. If there is difference in hydraulic pressure of not less than a predetermined value between the second hydraulic pressure and the third hydraulic pressure, the ECU 12 judges that there is a malfunction in the clutch control hydraulic circuit.

The first hydraulic pathway 15 connects to the junction hydraulic pathway 17 through a solenoid valve 19, the second hydraulic pathway 16 connects to the junction hydraulic pathway 17 through a solenoid valve 20, and the junction hydraulic pathway 17 connects to the clutch device 18. The solenoid valve 19 is a normally open (NO) first hydraulic circuit control valve, which switches to an open state when not energized, and switches to a closed state when energized. Meanwhile, the solenoid valve 20 is a normally closed (NC) second hydraulic circuit control valve, which switches to a closed state when not energized, and switches to an open state when energized.

Accordingly, when the vehicle is in a non-energized state, pressure of the first hydraulic pathway 15 is transmitted to the junction hydraulic pathway 17, through the solenoid valve 19. In other words, when the clutch lever 11 is gripped, hydraulic pressure is applied to the clutch device 18 to disconnect the clutch device 18, and when the clutch lever 11 is released, hydraulic pressure applied to the clutch device 18 is released to connect the clutch device 18. Hereinafter, such a conventional control mode of the clutch device 18 is referred to as a "first mode." Note that FIG. 1 shows states of the solenoid valves and connection states of the hydraulic pathways in the first mode, when the vehicle is in a non-energized state.

When the Vehicle on which the Clutch Control Hydraulic Circuit is Provided is Energized.

Figure 2:
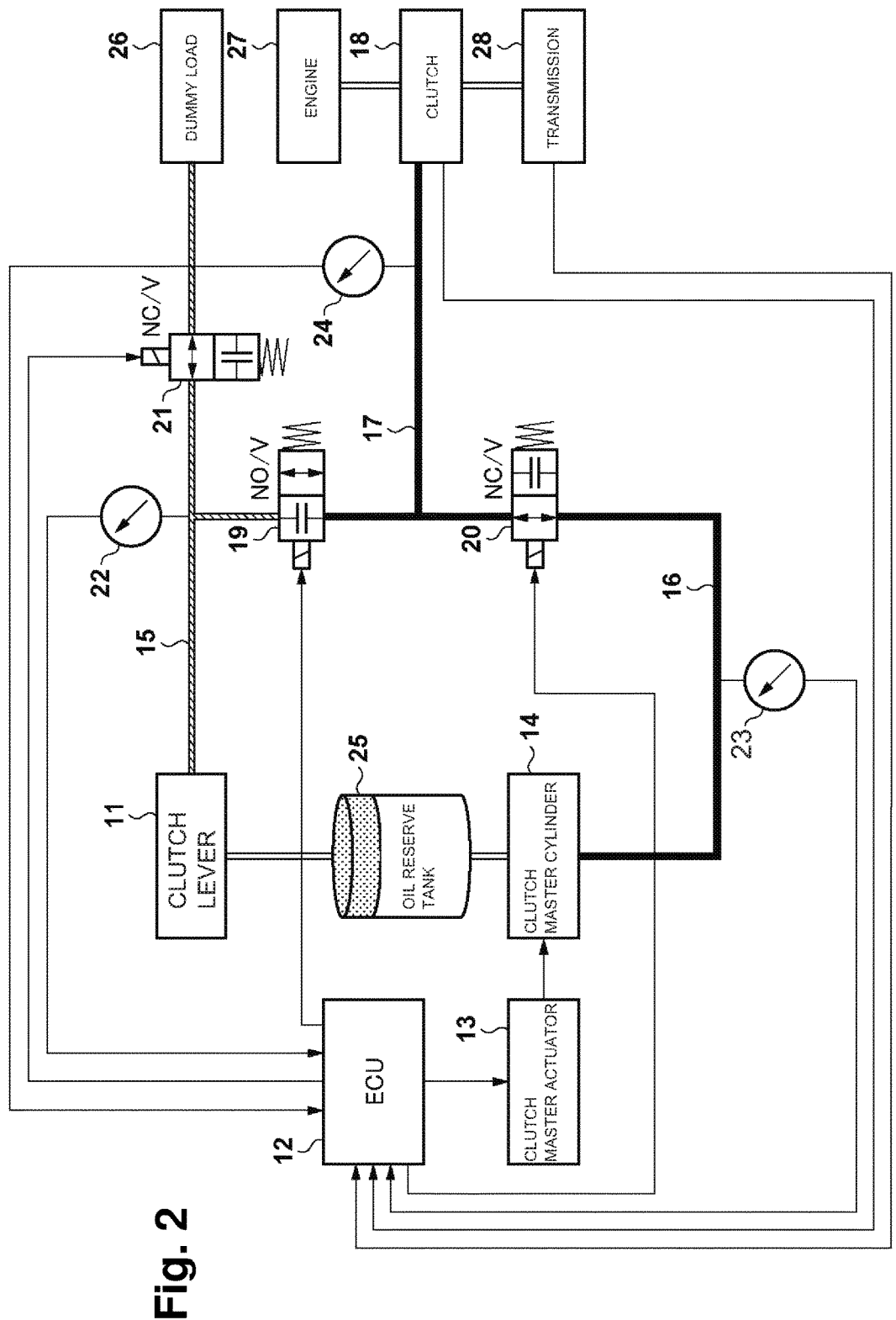
FIG. 2 is a block diagram similar to FIG. 1 but showing states of solenoid valves and connection states of hydraulic pathways of the clutch control hydraulic circuit, when a vehicle on which the clutch control hydraulic circuit is provided is energized.

A block diagram of FIG. 2 shows states of the solenoid valves and connection states of the hydraulic pathways, when the vehicle is energized.

When the vehicle is in an energized state, closing of the solenoid valve 19 disconnects the first hydraulic pathway 15 and the junction hydraulic pathway 17, and opening of the solenoid valve 20 connects the second hydraulic pathway 16 and the junction hydraulic pathway 17. Then, pressure of the second hydraulic pathway 16, which is controlled by the ECU 12 based on the pressure (first hydraulic pressure) of the first hydraulic pathway 15, is applied to the clutch device 18 through the junction hydraulic pathway 17, and controls connection and disconnection of the clutch device 18. Hereinafter, such a by-wire control mode of the clutch device 18 is referred to as a "second mode."

Also, in the second mode, a normally closed solenoid valve 21 as a third hydraulic circuit control valve is opened, and the first hydraulic pathway 15 is connected to a dummy load 26 through the solenoid valve 21. The dummy load 26 applies an operation load through a configuration such as a tandem master cylinder 10 described in Japanese Patent No. 4815256, for example, to thereby give the rider an operation feeling (resistance against the pressing operation) of the clutch lever 11, similar to that in the first mode.

In other words, by turning on and off the solenoid valves 19, 20, 21, the ECU 12 can switch between the first mode, in which the clutch device 18 is connected to the first hydraulic pathway 15 on the clutch lever 11 side to disable the stroke simulation, and the second mode, in which the clutch device 18 is connected to the second hydraulic pathway 16 on the actuator 13 side to enable the stroke simulation.

First Hydraulic Circuit Control Valve

Figure 3A:
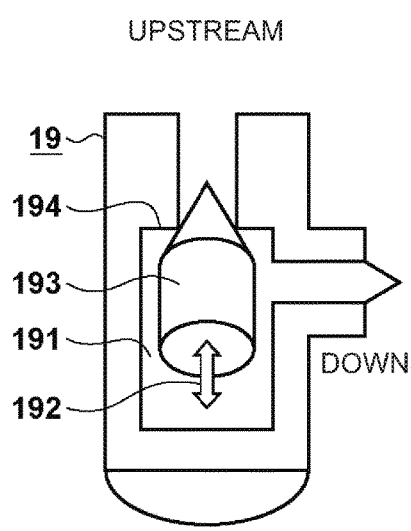
FIGS. 3A and 3B show a schematic configuration of an exemplary solenoid valve of the clutch control hydraulic circuit of FIG. 1 when in closed and opened states, respectively.
Figure 3B:
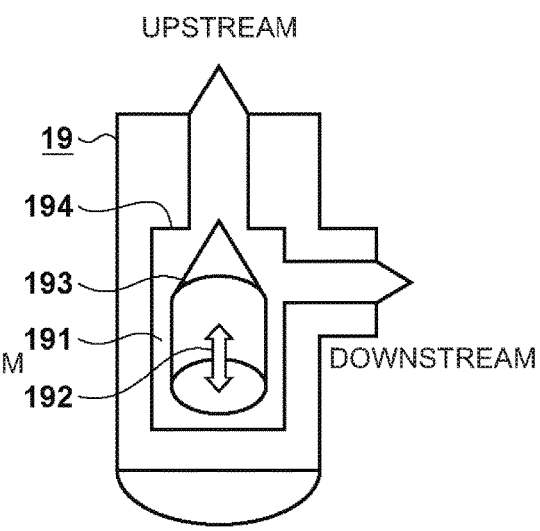

FIGS. 3A-3B shows a schematic configuration of the solenoid valve 19 which is a poppet valve having a valve element 193 movable in an axial direction 192 in a flow path 191 inside the valve. As shown FIG. 3A, the flow path is closed (ON), when an end part of the valve element 193 and a valve seat 194 are brought into contact by electromagnetic force. Meanwhile, as shown in FIG. 3B, the flow path is opened (OFF), when the end part of the valve element 193 is separated from the valve seat 194 by an unillustrated biasing member such as a spring when the electromagnetic force is not being applied.

The first hydraulic pathway 15, which is the hydraulic pathway on the upstream side, is connected to the upper side of the solenoid valve 19 of FIGS. 3A, 3B, and the junction hydraulic pathway 17, which is the hydraulic pathway on the downstream side, is connected to the right side of the solenoid valve 19 of FIGS. 3A, 3B. In the first mode (not energized), the end part of the valve element 193 is separated from the valve seat 194 (FIG. 3B) by the spring, and the first hydraulic pathway 15 is connected to the junction hydraulic pathway 17 via the solenoid valve 19. In this state, hydraulic pressure, which can be increased and decreased by operation of the clutch lever 11, controls connection and disconnection of the clutch device 18.

In the second mode (energized), the end part of the valve element 193 is brought into contact with the valve seat 194 (FIG. 3A) by electromagnetic force, and the first hydraulic pathway 15 and the junction hydraulic pathway 17 are disconnected. In this state, the solenoid valve 20 is opened, so that hydraulic pressure, which can be increased and decreased by operation of the actuator 13, controls connection and disconnection of the clutch device 18.

Pressure of the downstream side hydraulic pathway (junction hydraulic pathway 17) is applied to the valve element 193 of the closed solenoid valve 19. For this reason, if the valve is switched to a non-energized state from an energized state, while the pressure of the downstream side hydraulic pathway is higher than that of the upstream side hydraulic pathway (first hydraulic pathway 15), a so-called hydraulic pressure lock phenomenon occurs, where the valve element 193 does not separate from the valve seat 194 and maintains the closed state. That is, the hydraulic pressure lock phenomenon is caused by difference in pressure between the upstream side and downstream side of the valve member.

When the solenoid valve 19 is closed by the hydraulic pressure lock phenomenon, pressurizing the first hydraulic pathway 15 by operation of the clutch lever 11 (manual operation) releases the hydraulic pressure lock phenomenon, and opens the solenoid valve 19. When the manual intervention is performed, hydraulic pressure applied to the junction hydraulic pathway 17 by the actuator 13 and the master cylinder 14 is released through the first hydraulic pathway 15, since the oil reserve tank 25 is common.

Control by ECU

Upon Starting of Engine

A flowchart of FIG. 4 describes exemplary processing of the ECU 12 at the time of starting of the engine 27 according to an exemplary embodiment of the present invention. The processing shown in FIG. 4 is started, when the rider turns on an unillustrated main switch of the vehicle.

The ECU 12 turns on the solenoid valves 19, 20, 21 (S11), and judges whether or not the transmission 28 is in a neutral position (S12). If the transmission 28 is not in the neutral position, it is judged whether or not the clutch lever 11 is gripped (S13). Note that the judgment in step S13 may be made according to whether or not the first hydraulic pressure exceeds a predetermined value, or according to whether an unillustrated switch working in response to the clutch lever 11 is turned on or off.

If the transmission 28 is in the neutral position, or if the transmission 28 is not in the neutral position but the clutch lever 11 is gripped, the ECU 12 drives the actuator 13 to increase the second and third hydraulic pressures (S14), and judges whether or not the clutch device 18 is disconnected (S15). Meanwhile, if the transmission 28 is not in the neutral position, and the clutch lever 11 is not gripped, the processing returns to step S12.

If the clutch device 18 is disconnected, the ECU 12 judges that the engine can be started (S16), and when an unillustrated starter switch is pressed (S17), performs start processing of the engine 27 (S18).

Meanwhile, if the clutch device 18 is not disconnected, the ECU 12 judges that the engine cannot be started (S19), and warns of a malfunction in the clutch control hydraulic circuit (S20) by lighting an unillustrated warning lamp, for example. Note that as mentioned earlier, when there is difference in hydraulic pressures of not less than a predetermined value between the second hydraulic pressure and the third hydraulic pressure, the ECU 12 similarly judges that there is a malfunction in the clutch control hydraulic circuit, and performs steps S19 and S20.

Upon Occurrence of Failure

A description will be given of a case where a failure occurs in the ECU 12, while the first solenoid valve 19 is closed, the second solenoid valve 20 is opened, and the ECU 12 is controlling the actuator 13 to generate hydraulic pressure and thereby disconnecting the clutch device 18.

In this case, the solenoid valves 19, 20, 21 are turned off or de-energized. As a result, the solenoid valve 20 is closed, and therefore pressure of the junction hydraulic pathway 17 does not decrease through the solenoid valve 20. Also, as mentioned earlier, when the pressure of the junction hydraulic pathway 17 is higher than that of the first hydraulic pathway 15, the poppet type solenoid valve 19 maintains the closed state even when not energized due to the hydraulic pressure lock phenomenon, and therefore pressure of the junction hydraulic pathway 17 does not decrease through the solenoid valve 19, either.

Accordingly, even when the above failure occurs, pressure of the junction hydraulic pathway 17 does not drop suddenly, and disconnection of the clutch device 18 is maintained. Thereafter, when the first hydraulic pathway 15 is pressurized by the rider's operation of the clutch lever 11 (manual operation), the hydraulic pressure lock is released, the solenoid valve 19 is opened, and the clutch control hydraulic circuit resumes the first mode. In other words, disconnection of the clutch device 18 can be maintained until the manual intervention is performed.

Note that a case where pressure of the junction hydraulic pathway 17 becomes higher than that of the first hydraulic pathway 15, is when the first hydraulic pressure drops suddenly due to the rider's sudden release of the clutch lever 11, and the ECU 12 judges that it is undesirable to connect the clutch device 18 in a rapid pace, for example. In this case, the ECU 12 controls operation of the actuator 13, so that pressure of the junction hydraulic pathway 17 can decrease appropriately. Also, the second and third hydraulic pressures may sometimes be increased to a higher level than the first hydraulic pressure, to lighten the load of operation of the clutch lever 11 by the rider. Pressure of the junction hydraulic pathway 17 becomes higher than the first hydraulic pathway 15 in this case as well.

By designing the configuration of the clutch control hydraulic circuit in this manner, a clutch device having an automatic connection and disconnection function and a manual connection and disconnection function can surely switch to the manual connection and disconnection function when a vehicle on which the circuit is provided is not energized or when electronic control fails, and can maintain normal travel before the switching.

Although the invention has been explained in conjunction with the present exemplary embodiment heretofore, the technical scope of the invention is not limited to the scope described in the above-mentioned embodiment. It is apparent to those who are skilled in the art that various modifications and improvements may be added to the above-mentioned embodiment. It is also apparent from the description and the claims appended hereto that embodiments to which such modifications and improvements are added also fall within the technical scope of the invention.

DESCRIPTION OF REFERENCE NUMERALS

11 . . . clutch lever, 12 . . . electronic control unit, 13 . . . clutch master actuator, 15 . . . first hydraulic pathway, 16 . . . second hydraulic pathway, 17 . . . junction hydraulic pathway, 18 . . . clutch device, 19 . . . solenoid valve, 20 . . . solenoid valve

We claim:

1. A clutch control hydraulic circuit for use on a vehicle, comprising:
   a manual controller arbitrarily controllable by an operator;
   a control unit;
   an actuator for increasing and decreasing hydraulic pressure based on a control signal from the control unit;
   a hydraulic circuit including a first hydraulic pathway connected to the manual controller, a second hydraulic pathway connected to the actuator, and a junction hydraulic pathway which joins the first hydraulic pathway and the second hydraulic pathway; and
   a clutch device connected to the hydraulic circuit so that connection and disconnection of the clutch device is controlled by receiving pressure of the hydraulic circuit
   wherein:
   the junction hydraulic pathway is located downstream of the first and second hydraulic pathways;
   the hydraulic circuit includes first and second hydraulic circuit control valves connected to the control unit;
   the first hydraulic circuit control valve is provided between the first hydraulic pathway and the junction hydraulic pathway, normally switches to an open state when not energized, and switches to a closed state when energized;
   the second hydraulic circuit control valve is provided between the second hydraulic pathway and the junction hydraulic pathway, switches to a closed state when not energized, and switches to an open state when energized;
   the first hydraulic circuit control valve maintains its closed state, when switched to a non-energized state from an energized state while pressure of the junction hydraulic pathway is higher than pressure of first hydraulic pathway; and
   when the first hydraulic circuit control valve is closed in the non-energized state, pressurizing the first hydraulic pathway upstream of the first hydraulic circuit control valve by operation of the manual controller opens the first hydraulic circuit control valve.

2. The clutch control hydraulic circuit according to claim 1, wherein:
   said hydraulic circuit has an oil reserve tank; and
   said oil reserve tank is connected to said first hydraulic pathway and said second hydraulic pathway.

3. The clutch control hydraulic circuit according to claim 2, wherein
   said first hydraulic circuit control valve is a poppet valve having a valve element movable in an axial direction in a flow path inside the poppet valve such that an end part of the valve element closes the flow path.

4. The clutch control hydraulic circuit according to claim 2, wherein:
said control unit switches between a first mode, in which said clutch device is connected to said manual controller, and a second mode, in which said clutch device is connected to said actuator;
said first and second hydraulic circuit control valves are not energized in said first mode; and
said first and second hydraulic circuit control valves are energized in said second mode.

5. The clutch control hydraulic circuit according to claim 4, further comprising:
a dummy load for applying an operation load on operation of said manual controller; and
a third hydraulic circuit control valve which is provided between said first hydraulic pathway and said dummy load, switches to a closed state when not energized, and switches to an open state when energized, wherein:
said third hydraulic circuit control valve is not energized in said first mode; and
said third hydraulic circuit control valve is energized in said second mode.

6. The clutch control hydraulic circuit according to claim 5, wherein
said first hydraulic circuit control valve is a poppet valve having a valve element movable in an axial direction in a flow path inside the poppet valve such that an end part of the valve element closes the flow path.

7. The clutch control hydraulic circuit according to claim 1, wherein:
said control unit switches between a first mode, in which said clutch device is connected to said manual controller, and a second mode, in which said clutch device is connected to said actuator;
said first and second hydraulic circuit control valves are not energized in said first mode; and
said first and second hydraulic circuit control valves are energized in said second mode.

8. The clutch control hydraulic circuit according to claim 7, further comprising:
a dummy load for applying an operation load on operation of said manual controller; and
a third hydraulic circuit control valve which is provided between said first hydraulic pathway and said dummy load, switches to a closed state when not energized, and switches to an open state when energized, wherein:
said third hydraulic circuit control valve is not energized in said first mode; and
said third hydraulic circuit control valve is energized in said second mode.

9. The clutch control hydraulic circuit according to claim 1, wherein
said first hydraulic circuit control valve is a poppet valve having a valve element movable in an axial direction in a flow path inside the poppet valve such that an end part of the valve element closes the flow path.

10. A vehicle including a clutch device, the vehicle comprising:
a manual clutch controller arbitrarily controllable by an operator;
a control unit;
a clutch actuator for increasing and decreasing hydraulic pressure based on a control signal from the control unit;
a hydraulic circuit including a first hydraulic pathway connected to the manual clutch controller, a second hydraulic pathway connected to the clutch actuator, and a junction hydraulic pathway which joins the first hydraulic pathway and the second hydraulic pathway; and
a clutch device connected to the hydraulic circuit so that connection and disconnection of the clutch device is controlled by receiving pressure of the hydraulic circuit wherein:
the junction hydraulic pathway is located downstream of the first and second hydraulic pathways;
the hydraulic circuit includes first and second hydraulic circuit control valves connected to the control unit;
the first hydraulic circuit control valve is provided between the first hydraulic pathway and the junction hydraulic pathway, normally switches to an open state when not energized, and switches to a closed state when energized;
the second hydraulic circuit control valve is provided between the second hydraulic pathway and the junction hydraulic pathway, switches to a closed state when not energized, and switches to an open state when energized;
the first hydraulic circuit control valve maintains its closed state, when switched to a non-energized state from an energized state while pressure of the junction hydraulic pathway is higher than pressure of first hydraulic pathway; and
when the first hydraulic circuit control valve is closed in the non-energized state, pressurizing the first hydraulic pathway upstream of the first hydraulic circuit control valve by operation of the manual clutch controller opens the first hydraulic circuit control valve.

11. The clutch control hydraulic circuit according to claim 10, wherein:
said hydraulic circuit has an oil reserve tank; and
said oil reserve tank is connected to said first hydraulic pathway and said second hydraulic pathway.

12. The clutch control hydraulic circuit according to claim 11, wherein
said first hydraulic circuit control valve is a poppet valve having a valve element movable in an axial direction in a flow path inside the poppet valve such that an end part of the valve element closes the flow path.

13. The clutch control hydraulic circuit according to claim 11, wherein:
said control unit switches between a first mode, in which said clutch device is connected to said manual clutch controller, and a second mode, in which said clutch device is connected to said clutch actuator;
said first and second hydraulic circuit control valves are not energized in said first mode; and
said first and second hydraulic circuit control valves are energized in said second mode.

14. The clutch control hydraulic circuit according to claim 13, further comprising:
a dummy load for applying an operation load on operation of said manual clutch controller; and
a third hydraulic circuit control valve which is provided between said first hydraulic pathway and said dummy load, switches to a closed state when not energized, and switches to an open state when energized, wherein:
said third hydraulic circuit control valve is not energized in said first mode; and
said third hydraulic circuit control valve is energized in said second mode.

15. The clutch control hydraulic circuit according to claim 14, wherein
said first hydraulic circuit control valve is a poppet valve having a valve element movable in an axial direction in a flow path inside the poppet valve such that an end part of the valve element closes the flow path.

16. The clutch control hydraulic circuit according to claim 10, wherein:
said control unit switches between a first mode, in which said clutch device is connected to said manual clutch controller, and a second mode, in which said clutch device is connected to said clutch actuator;
said first and second hydraulic circuit control valves are not energized in said first mode; and
said first and second hydraulic circuit control valves are energized in said second mode.

17. The clutch control hydraulic circuit according to claim 16, further comprising:
a dummy load for applying an operation load on operation of said manual clutch controller; and
a third hydraulic circuit control valve which is provided between said first hydraulic pathway and said dummy load, switches to a closed state when not energized, and switches to an open state when energized, wherein:
said third hydraulic circuit control valve is not energized in said first mode; and
said third hydraulic circuit control valve is energized in said second mode.

18. The clutch control hydraulic circuit according to claim 10, wherein
said first hydraulic circuit control valve is a poppet valve having a valve element movable in an axial direction in a flow path inside the poppet valve such that an end part of the valve element closes the flow path.

* * * * *